Figure 1:
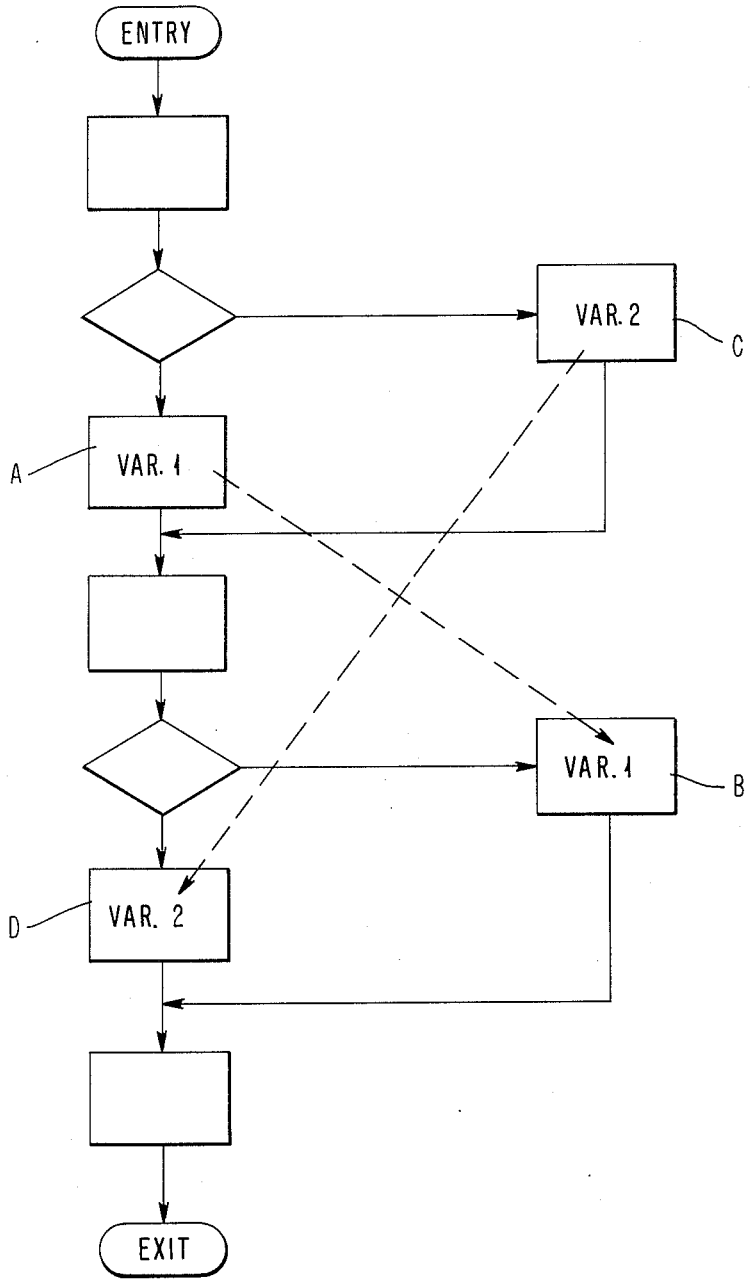
Figure 2A:
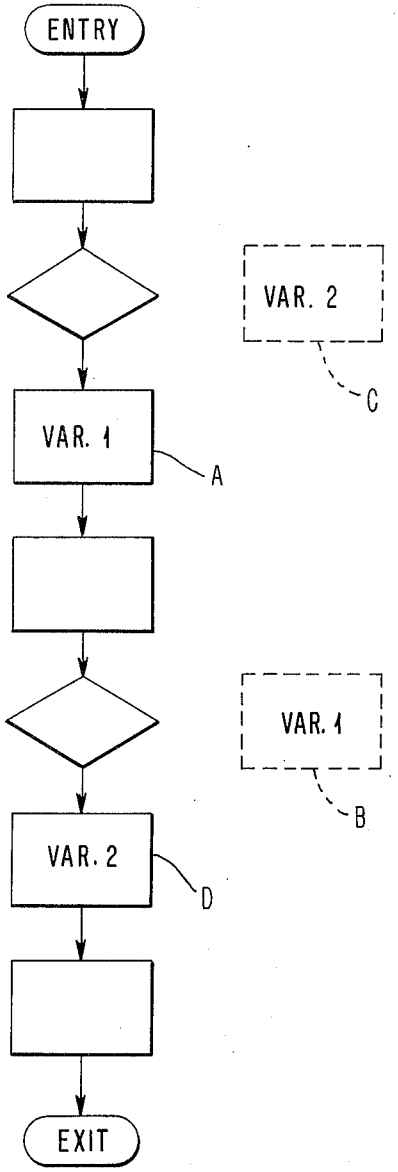
Figure 2B:
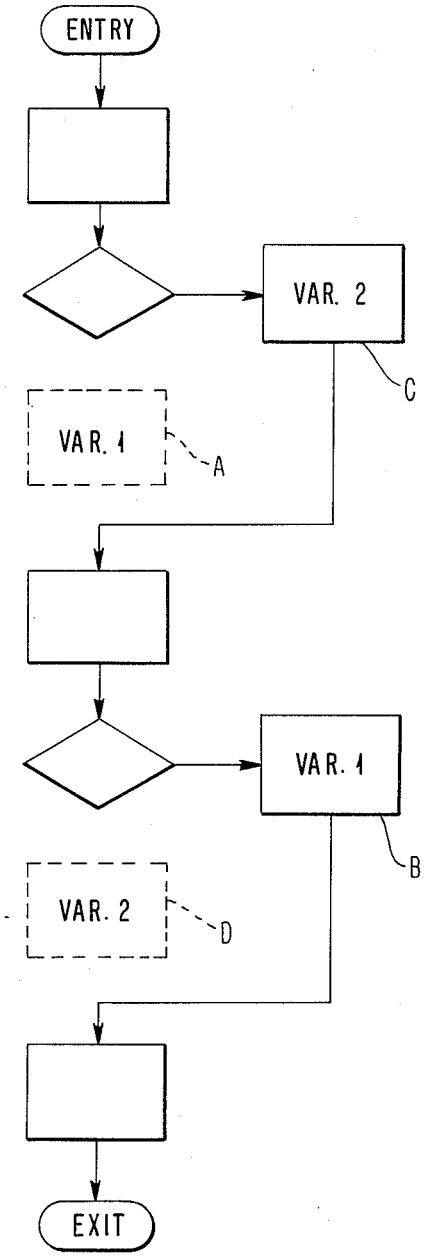
Figure 3A:
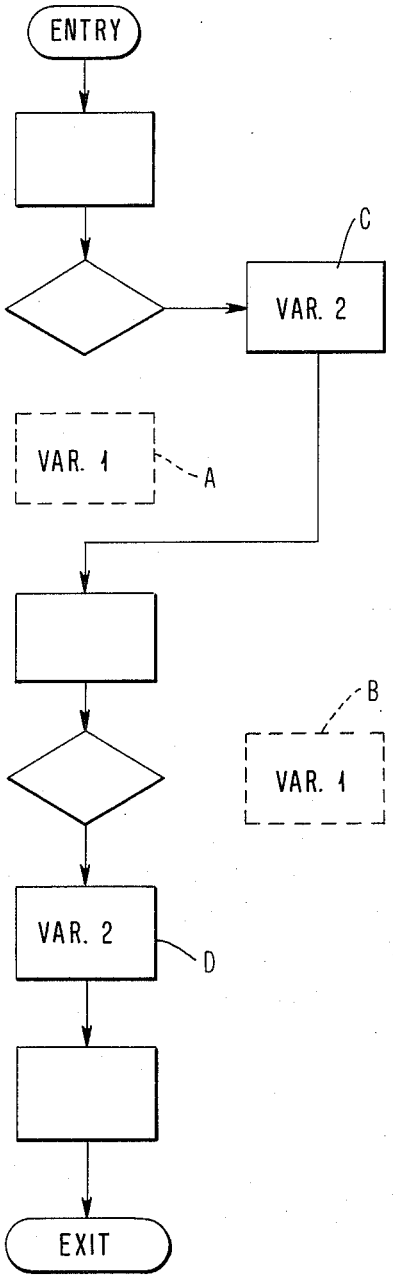
Figure 3B:
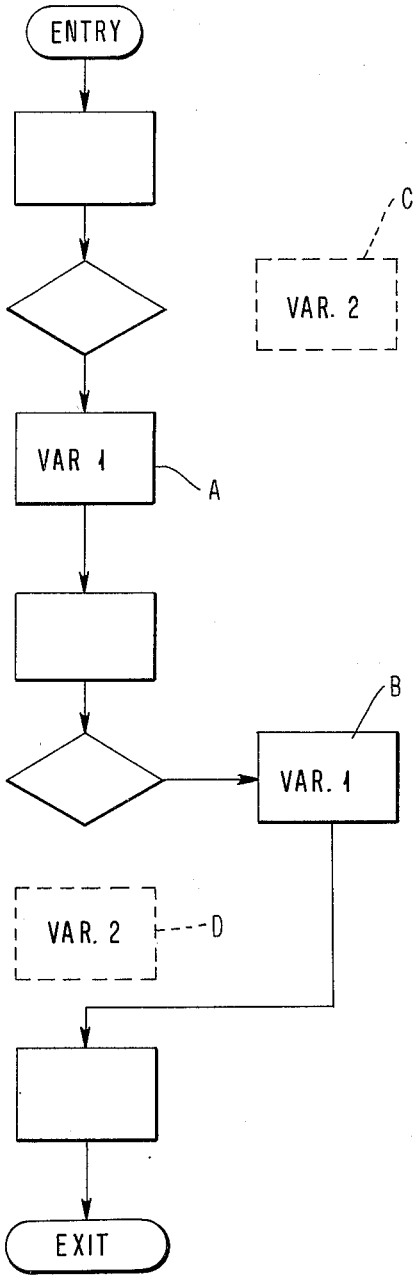
Figure 6:
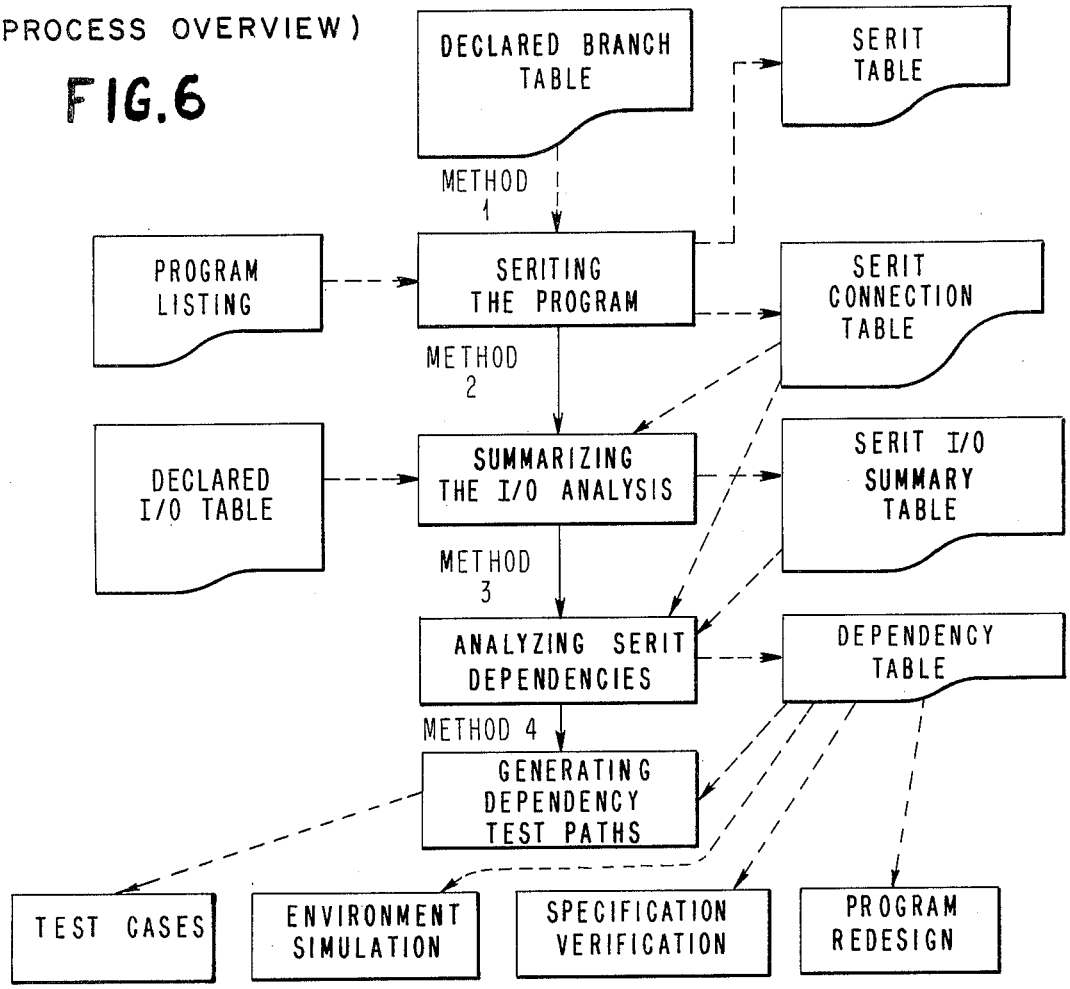
Figure 12:
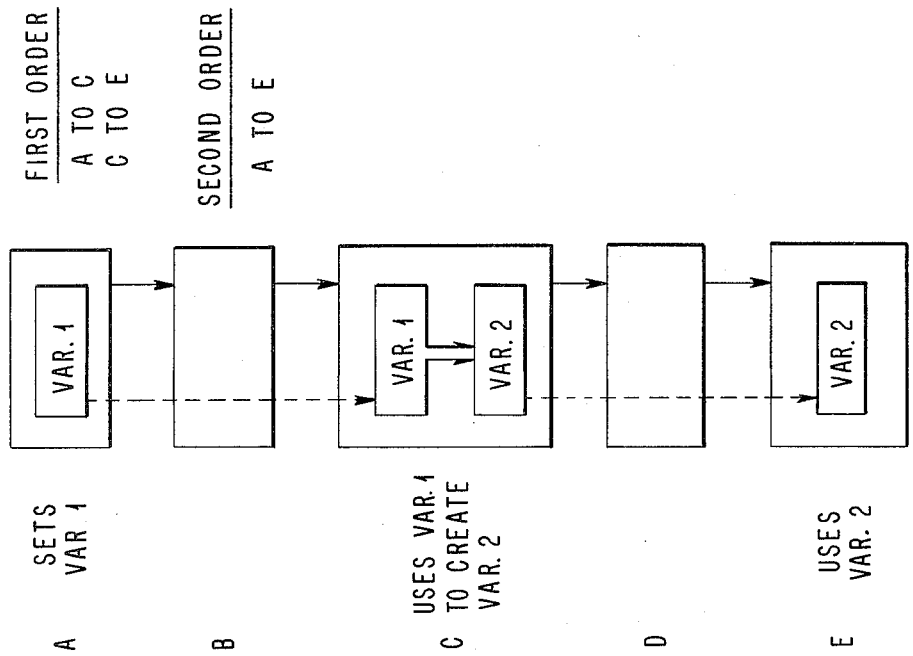
Figure 11:
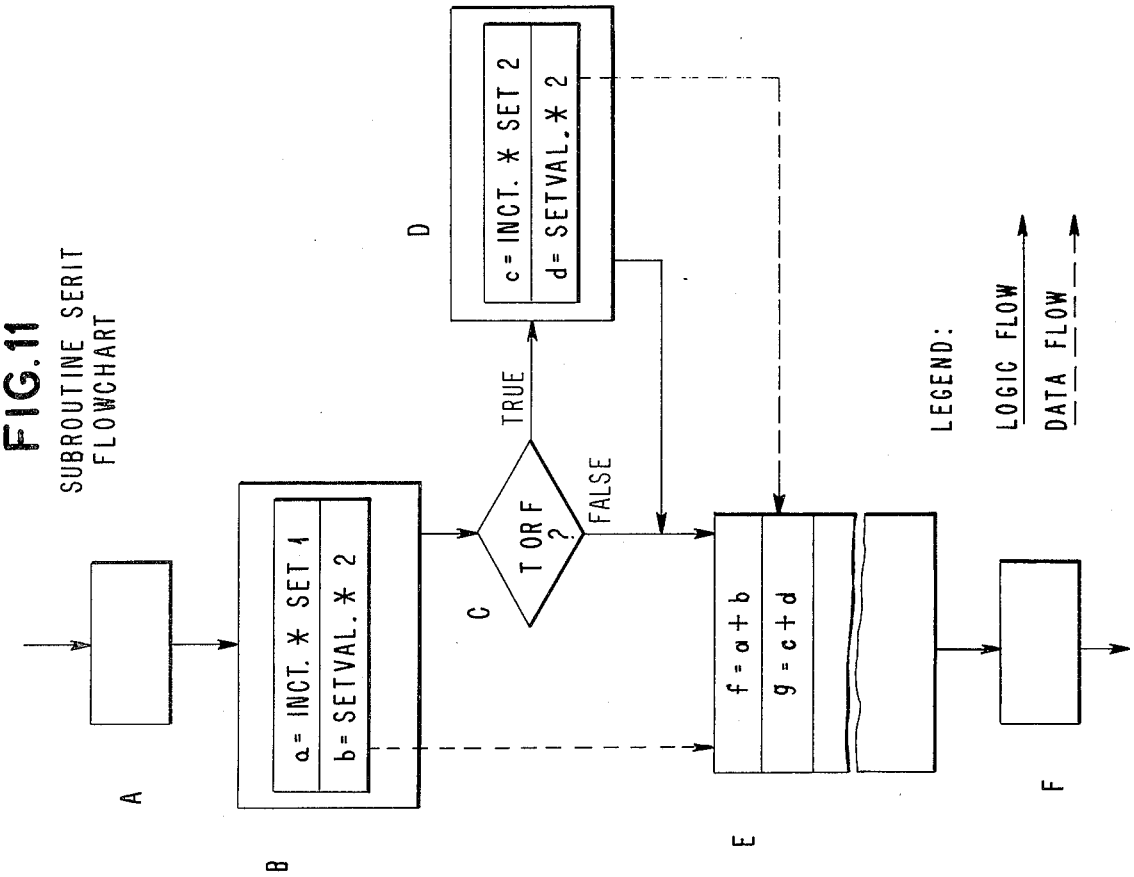

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED OCTOBER 7, 1975

939 O.G. 9

T939,010

PROGRAM TEST METHOD

Richard Anthony Bender, Hyde Park, and Earl Lee Pottorff, Poughkeepsie, N.Y., assignors to International Business Machines Corporation, Armonk, N.Y.

Continuation of application Ser. No. 249,650, May 2, 1972. This application Mar. 25, 1974, Ser. No. 454,047

Int. Cl. G06f *11/04, 9/06;* G05b *17/02*

U.S. Cl. 444—1

26 Sheets Drawing. 127 Pages Specification

A method of analyzing computer programs which are to be tested. The method determines the data flow patterns through a program and uses the data flow patterns to identify a set of paths in the program which must be exercised in order to verify a program's correctness. The method includes the steps of: partitioning the program source statements into groups (each of which always executes as a serial unit, i.e. serit), determining the execution sequences of the different serial units, determining the data input and output activities of the serial units across their boundaries and the program boundaries, locating the sources of input data to each serial unit, and identifying test paths through the program such that every first-order dependency (each direct source of an input data item provided to each serial unit) is exercised by test data designed to exercise this set of test paths. The method can be applied to programs written in different programming languages.

FIG. 4 (SERIT FLOWCHART)
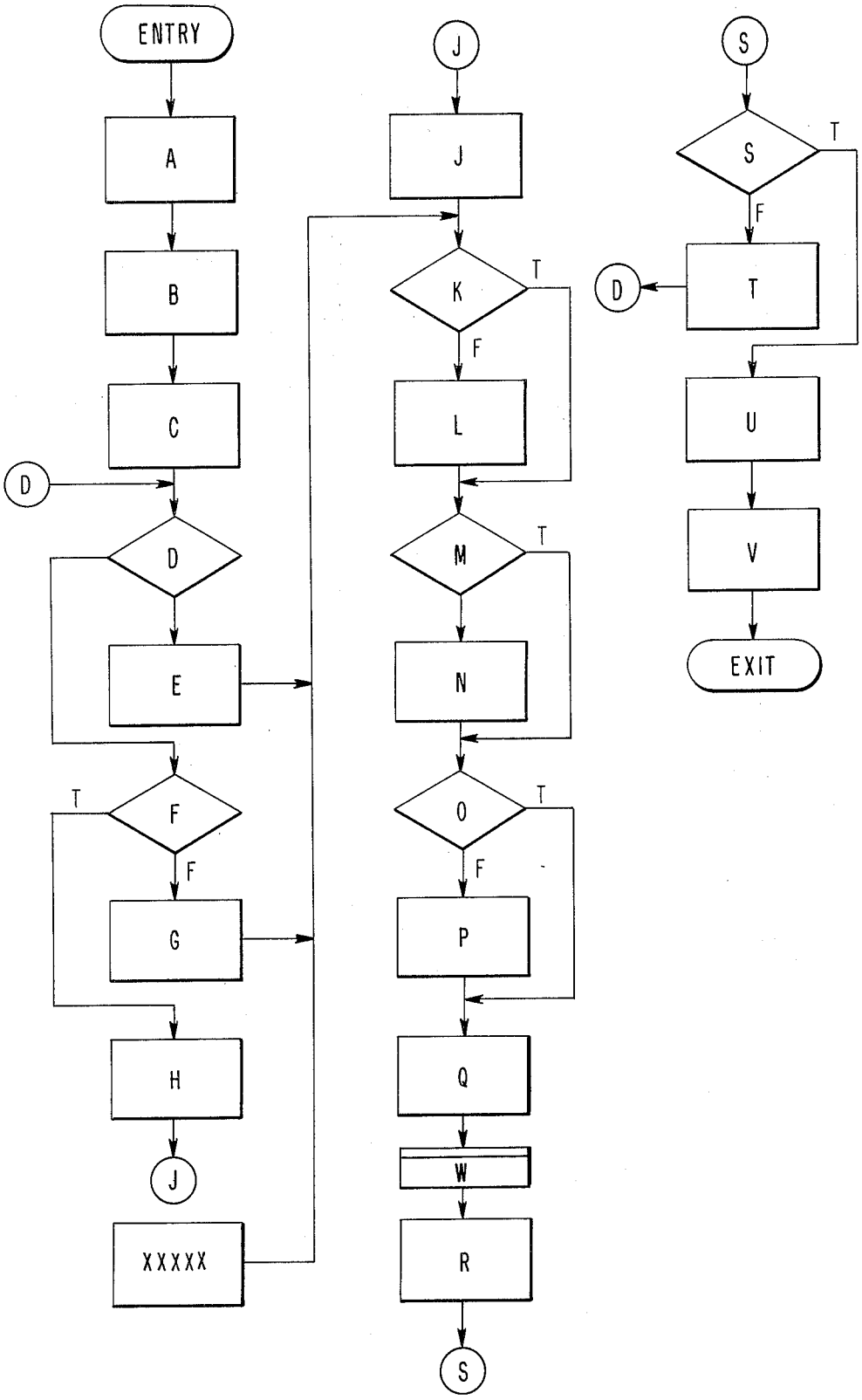

FIG. 5A (PROGRAM FUNCTION)
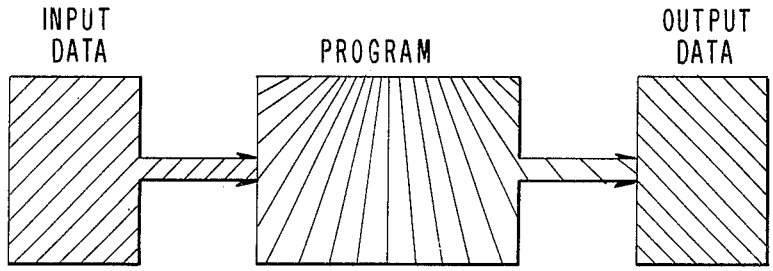
FIG. 5B
(TRANSFORMATION BY PROGRAM INSTRUCTIONS)
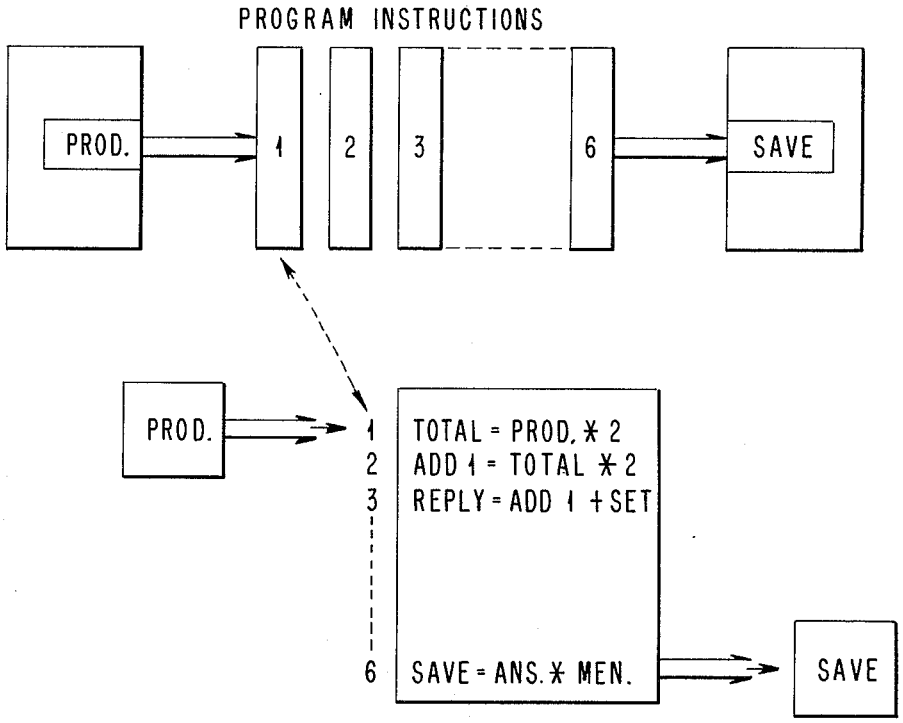

(PROCESS OVERVIEW)

DECLARED BRANCH TABLE

| | LOC. OF BR. | # TGTS. | TGT. 1 | TGT. 2 | TGT. n |
|---|---|---|---|---|---|
| 0 | | | | | |
| 1 | | | | | |
| LAST | | | | | |

DECL. I/O TABLE

| | LOC. OF STMT. | INPUT(S) | OUTPUT(S) |
|---|---|---|---|
| 0 | | | |
| 1 | | | |
| LAST | | | |

FIG. 7 (METHOD 1: SERITING OVERVIEW)
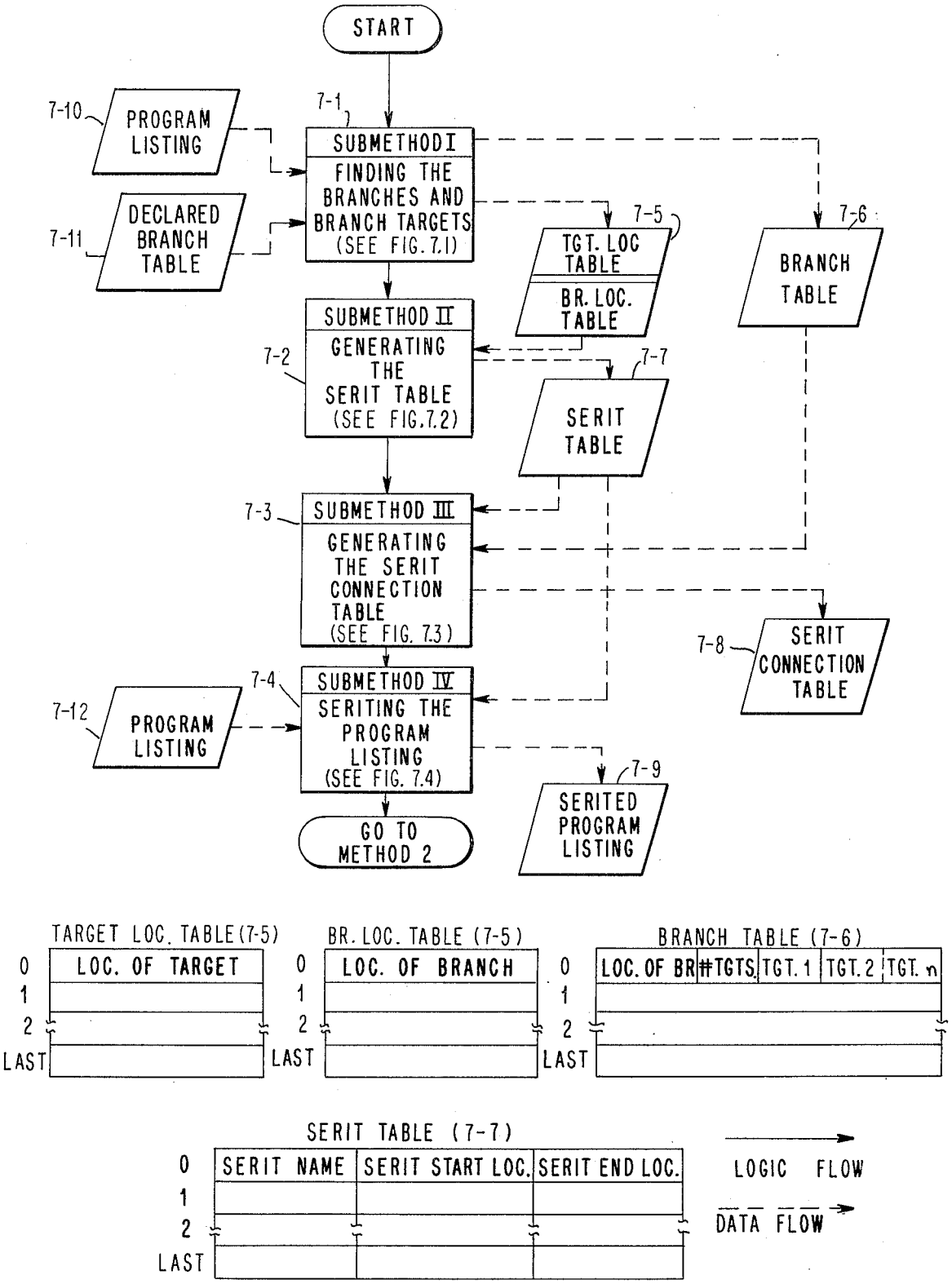

FIG. 7.1 (METHOD 1, SUBMETHOD I: FINDING BRANCHES & BRANCH TARGETS)
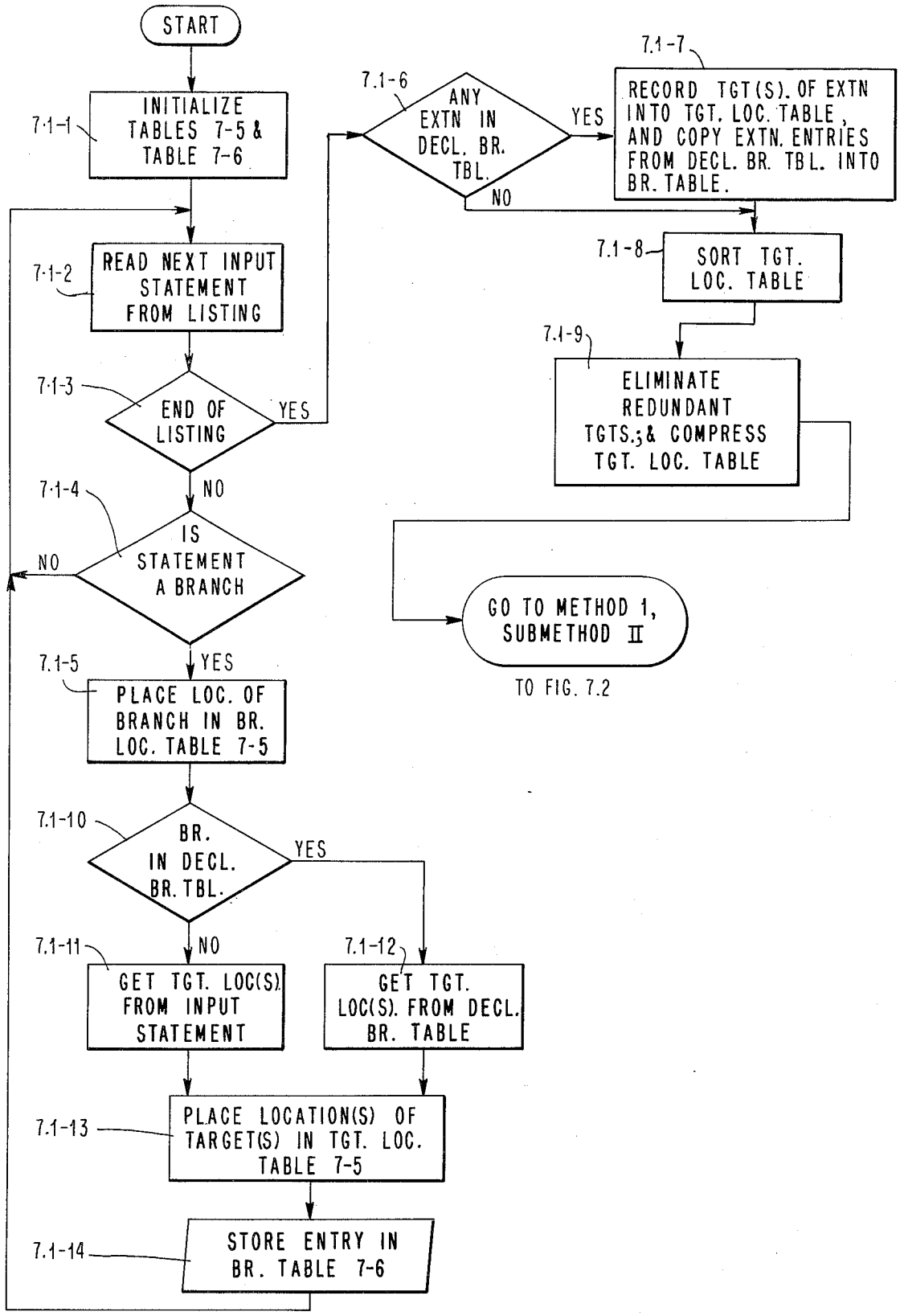

FIG. 7.2 (METHOD 1, SUBMETHOD II: GENERATING THE SERIT TABLE)
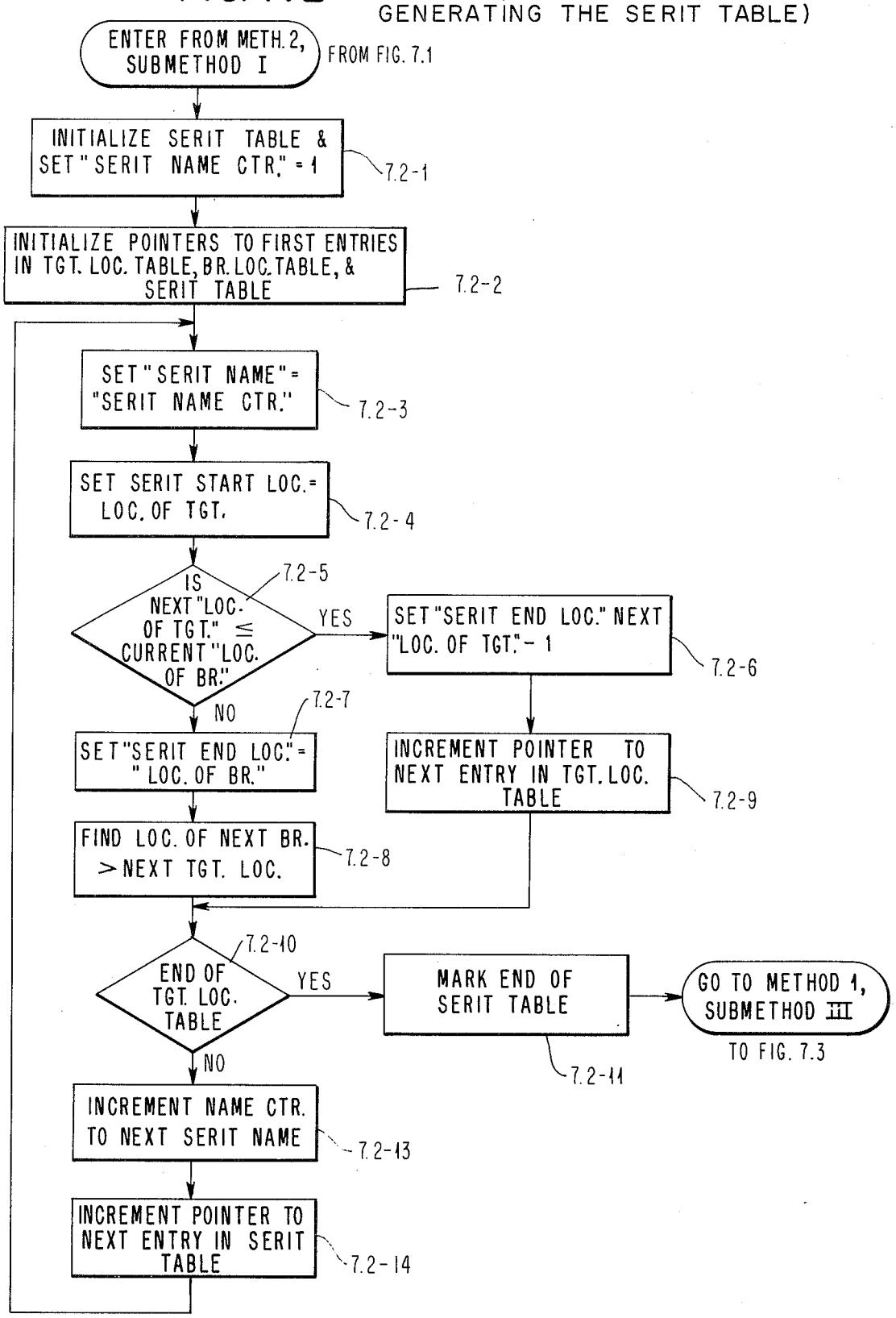

FIG. 7.3 (METHOD 1 SUBMETHOD III: GENERATING THE SERIT CONNECTION TABLE)
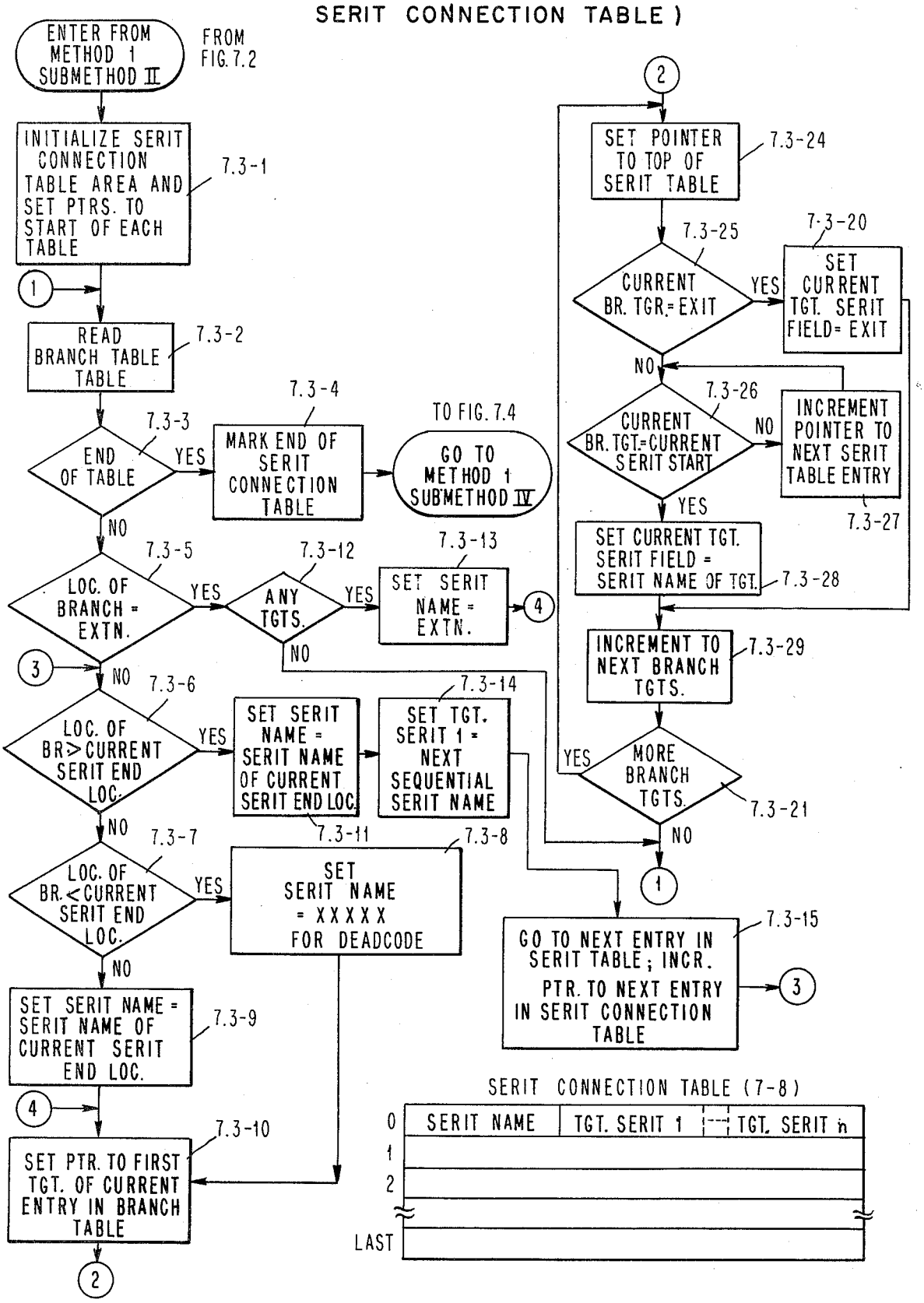

FIG. 7.4 (METHOD 1, SUBMETHOD IV: SERITING THE PROGRAM LISTING)
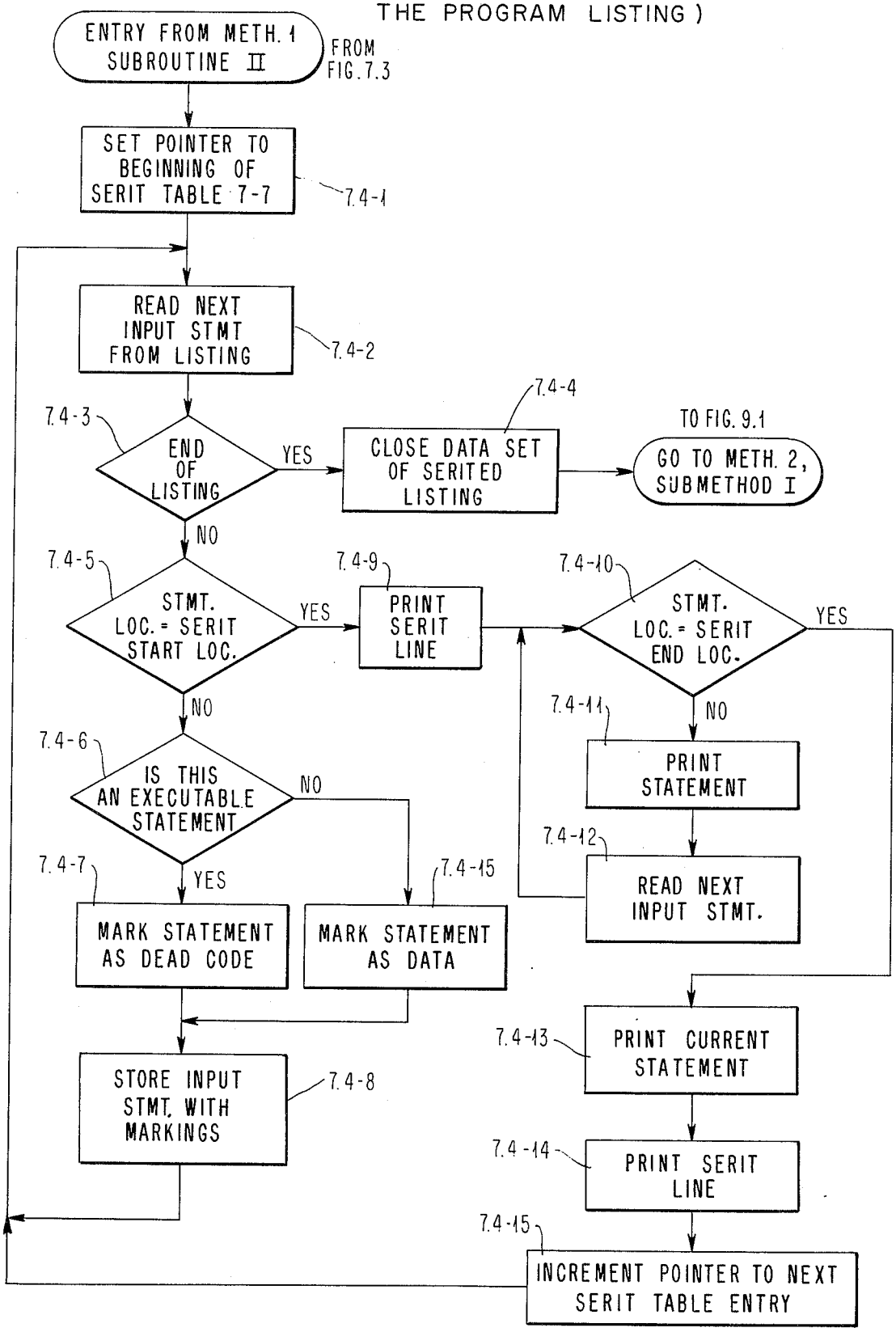

FIG. 8 (SERIT FLOWCHARTING)
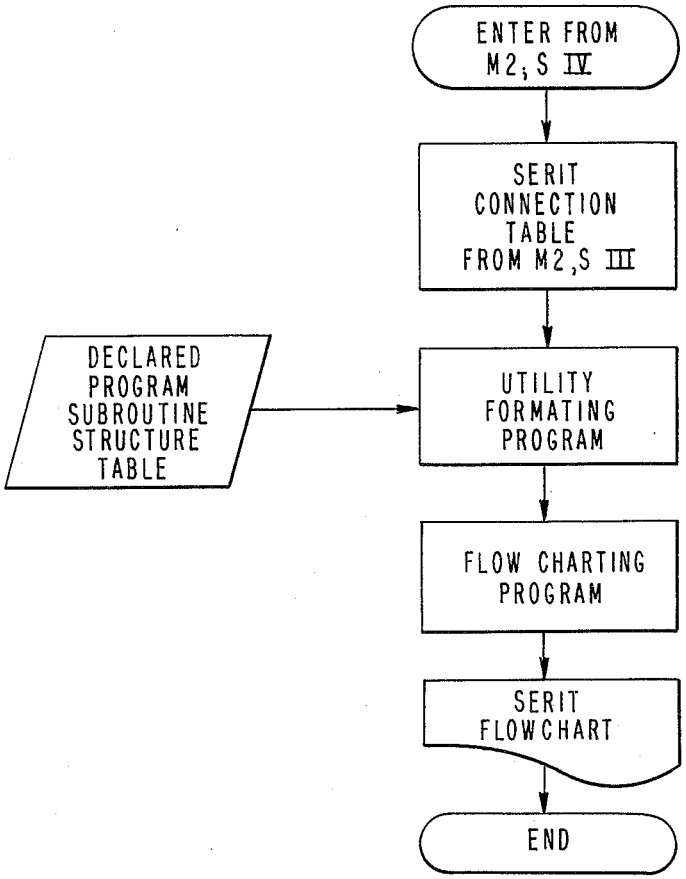
FIG. 9 (METHOD 2: SUMMARIZING OVERVIEW)
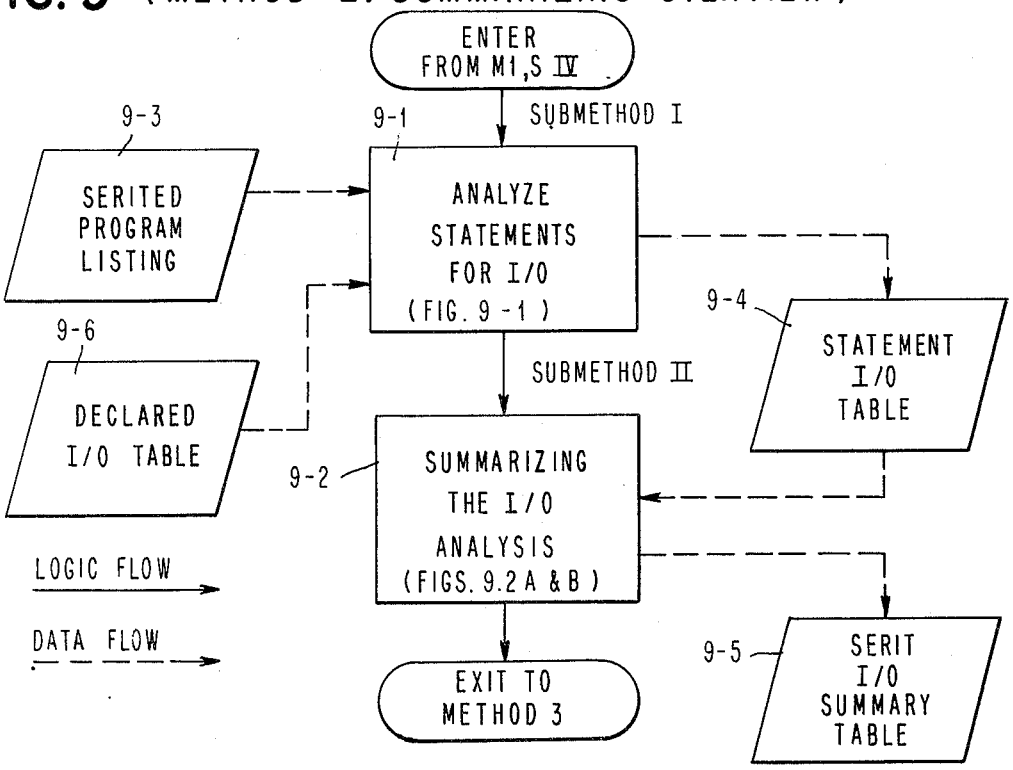

FIG. 9.1 (METHOD 2, SUBMETHOD I: ANALYZING THE STATEMENTS FOR I/O)
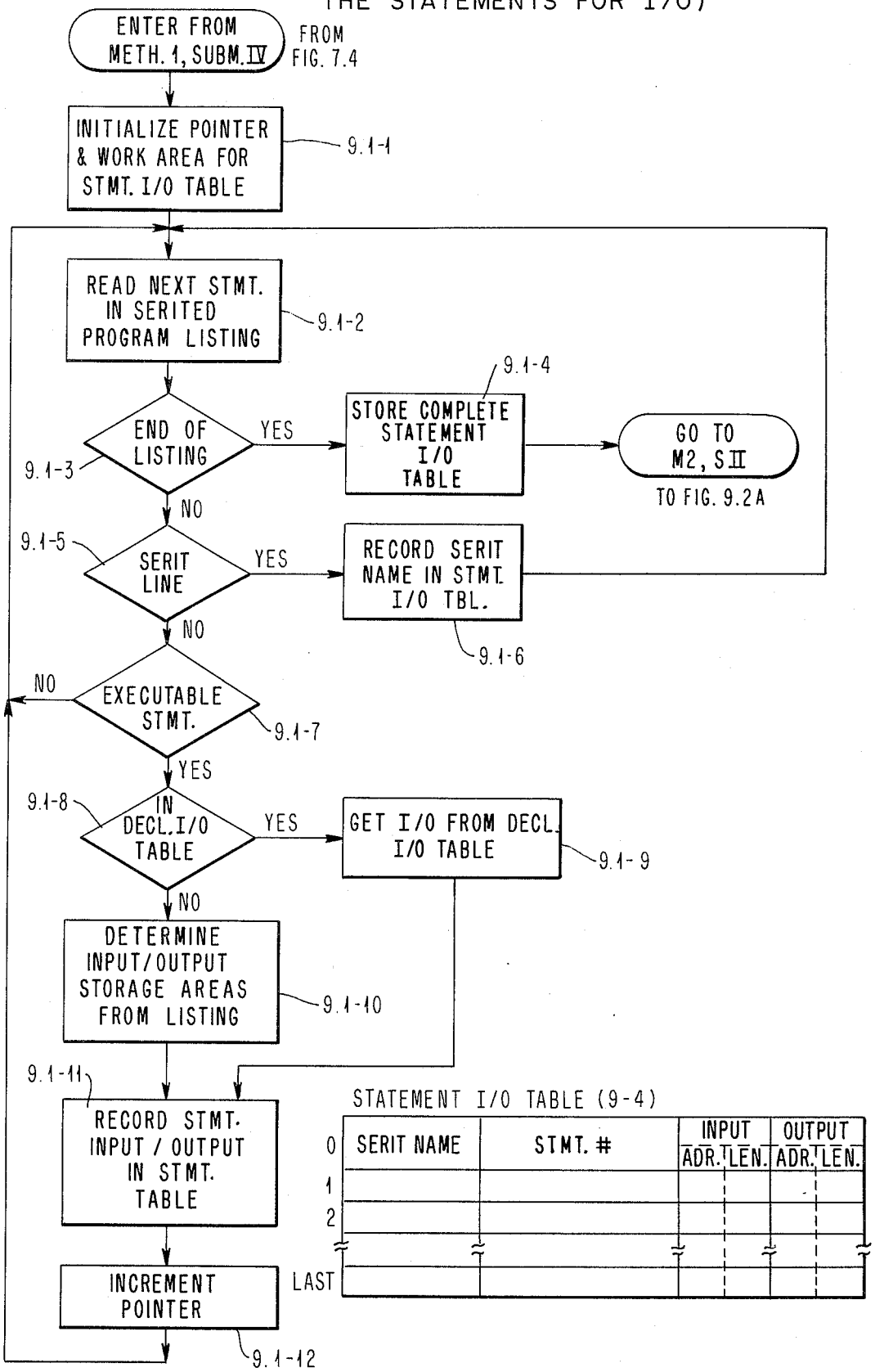
STATEMENT I/O TABLE (9-4)
| | SERIT NAME | STMT. # | INPUT | | OUTPUT | |
|---|---|---|---|---|---|---|
| | | | ADR. | LEN. | ADR. | LEN. |
| 0 | | | | | | |
| 1 | | | | | | |
| 2 | | | | | | |
| LAST | | | | | | |

FIG. 9.2A
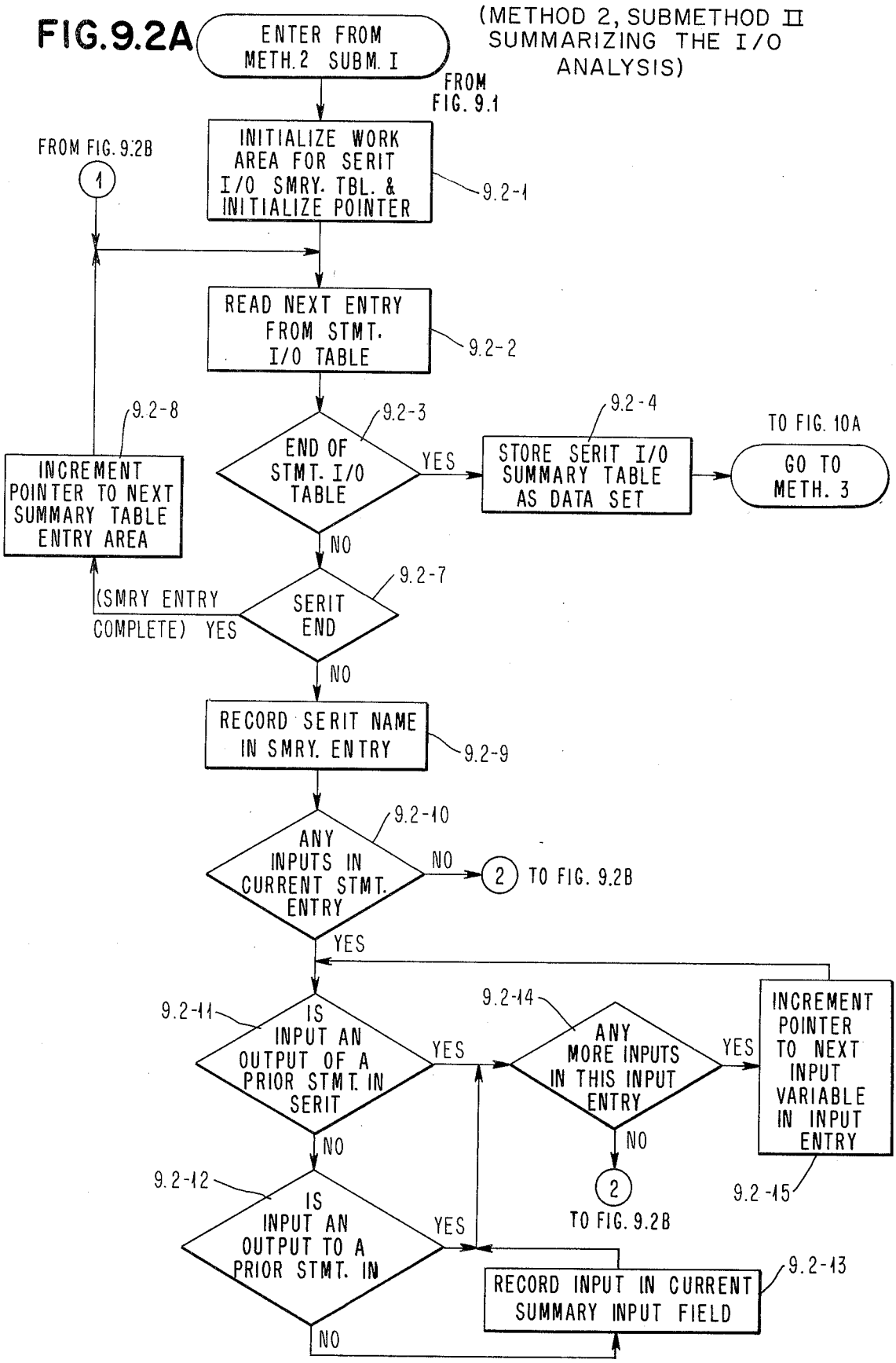

FIG. 9.2B (M2, S II CONT.)
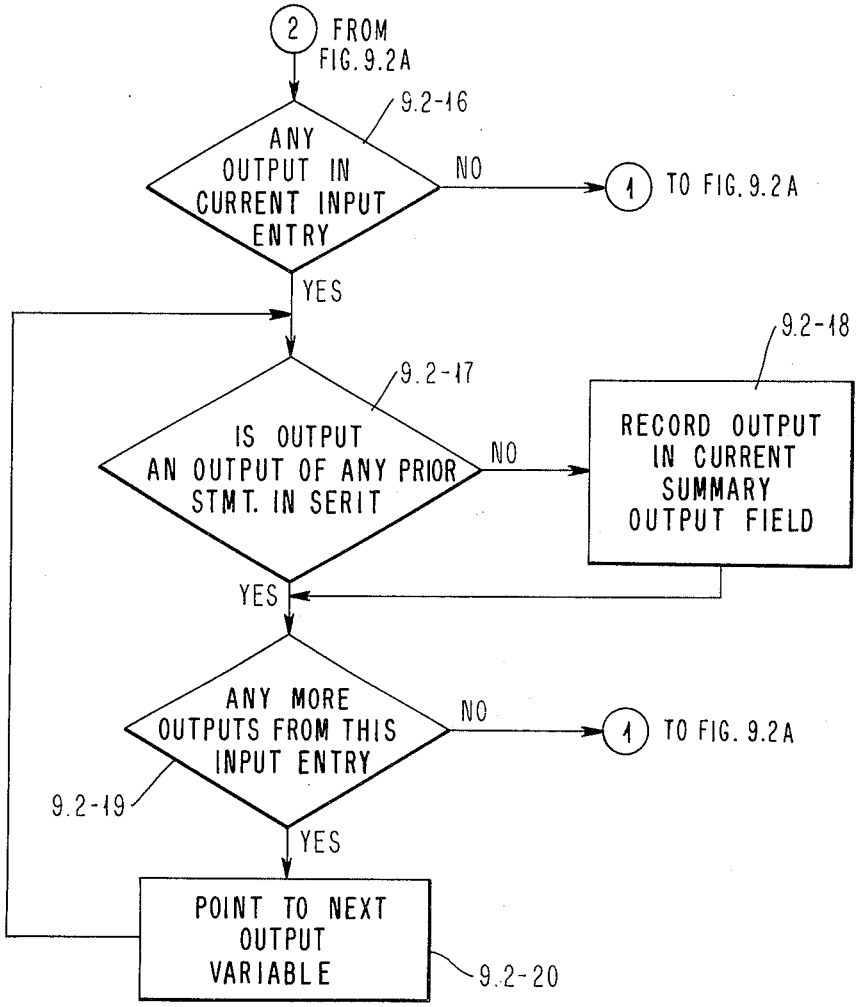
SERIT I/O SUMMARY TABLE (9-5)
| | SERIT NAME | OUTPUT VARIABLE(S) | INPUT VARIABLE(S) |
|---|---|---|---|
| 0 | | | |
| 1 | | | |
| LAST | | | |

FIG. 10A (METHOD 3: ANALYZING SERIT DEPENDENCY)
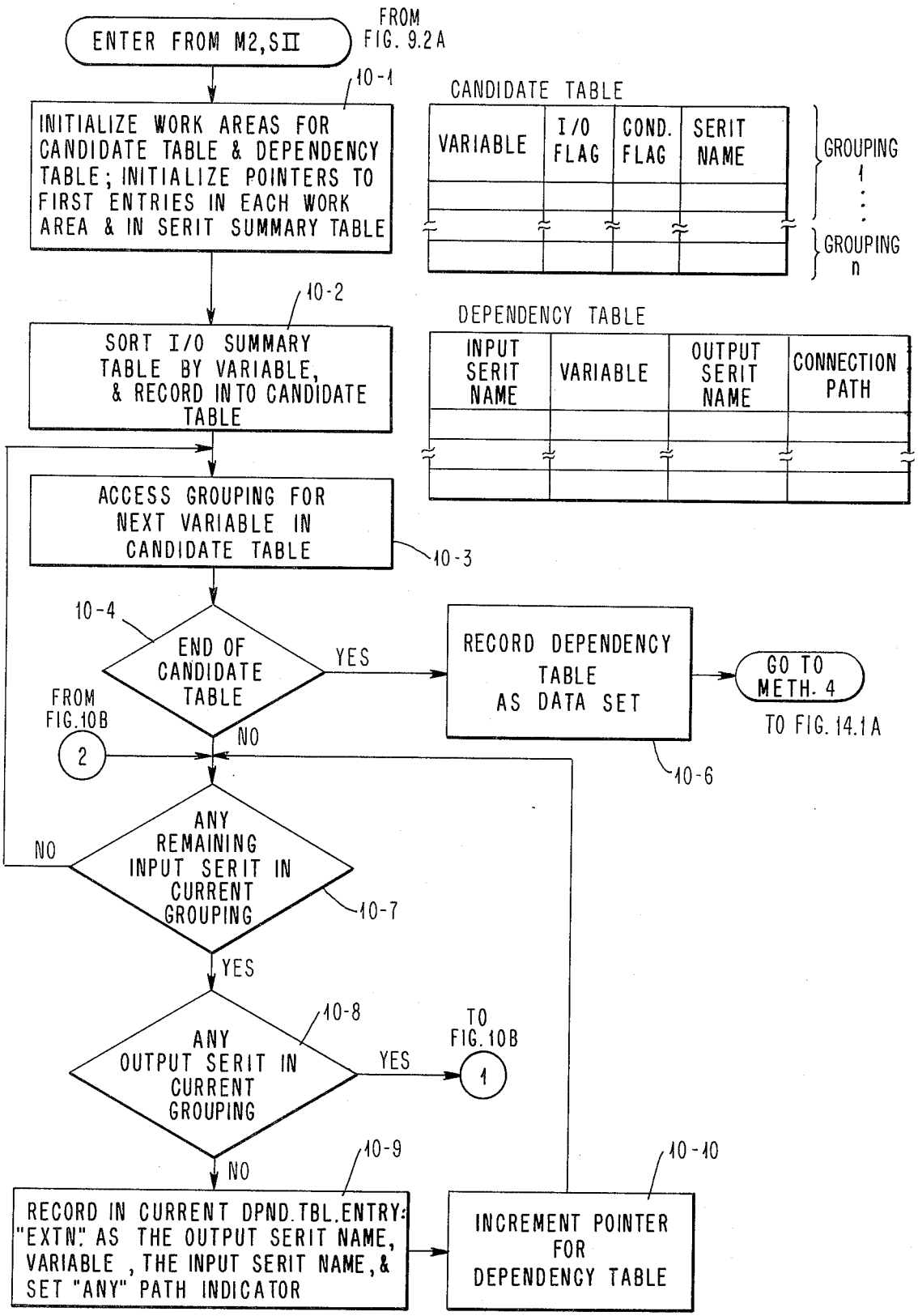

FIG. 10B (METHOD 3 CONT.)
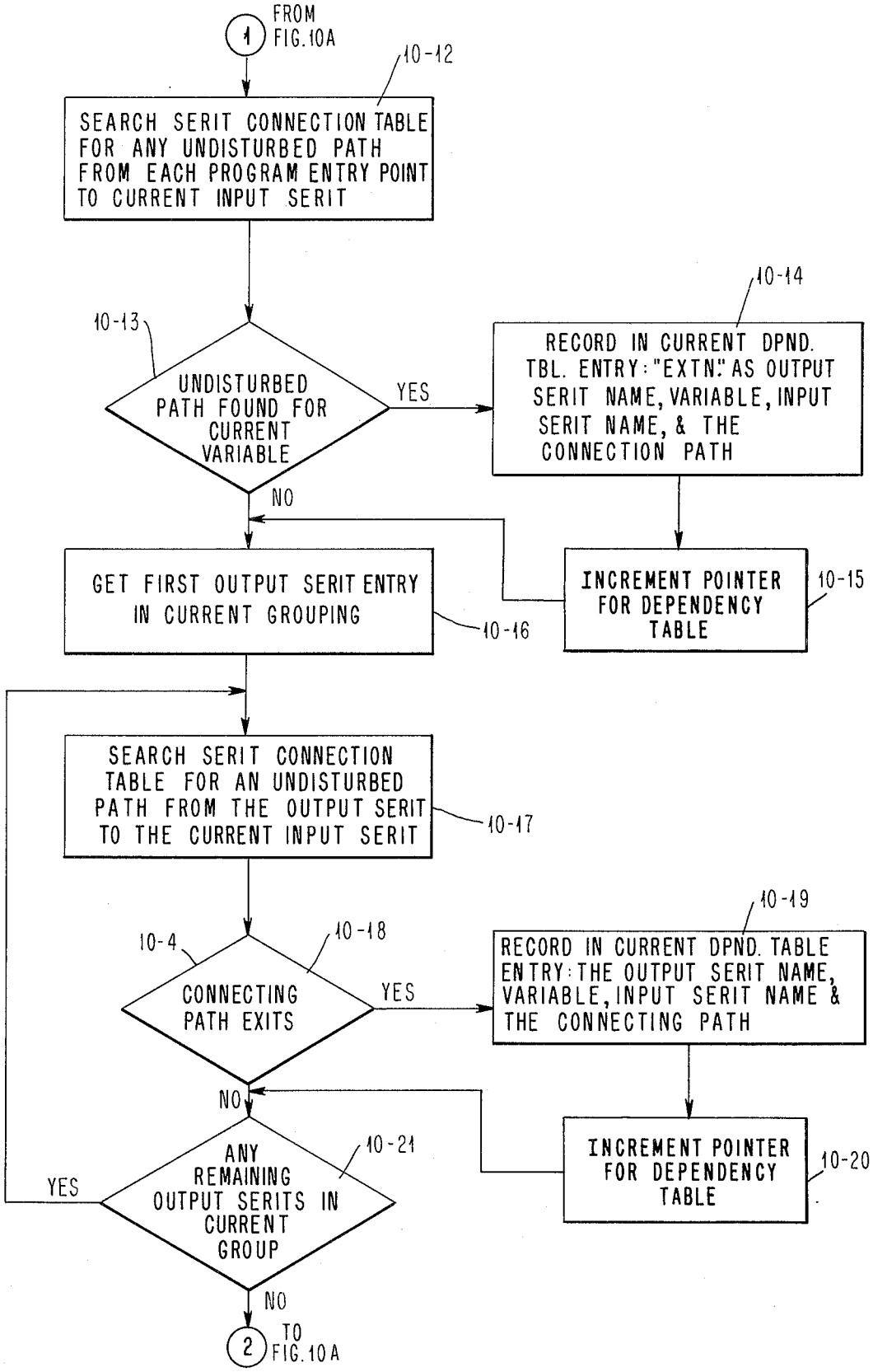

SUBROUTINE SERIT FLOWCHART

FIG. 13 (GENERATING TEST PATHS)
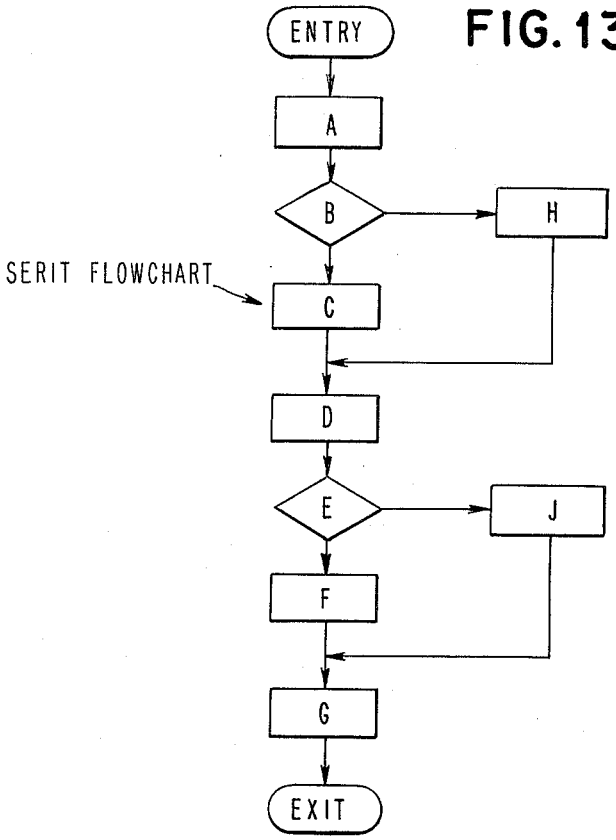
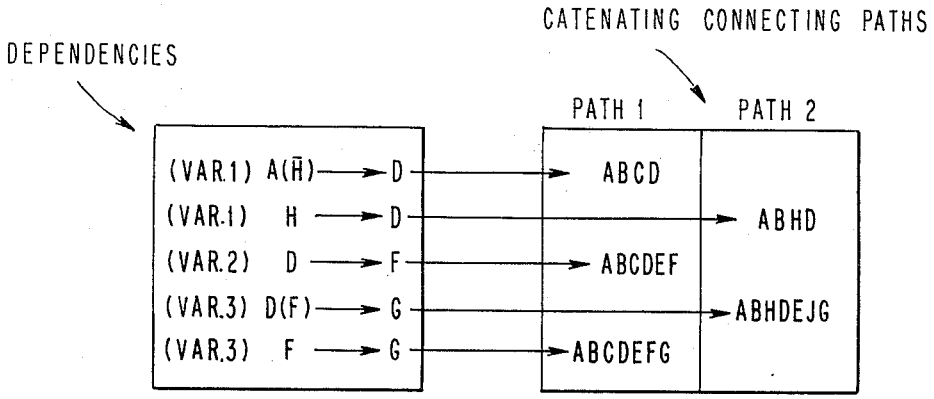

FIG.14 (METHOD 4: GENERATING DEPENDENCY TEST PATHS)
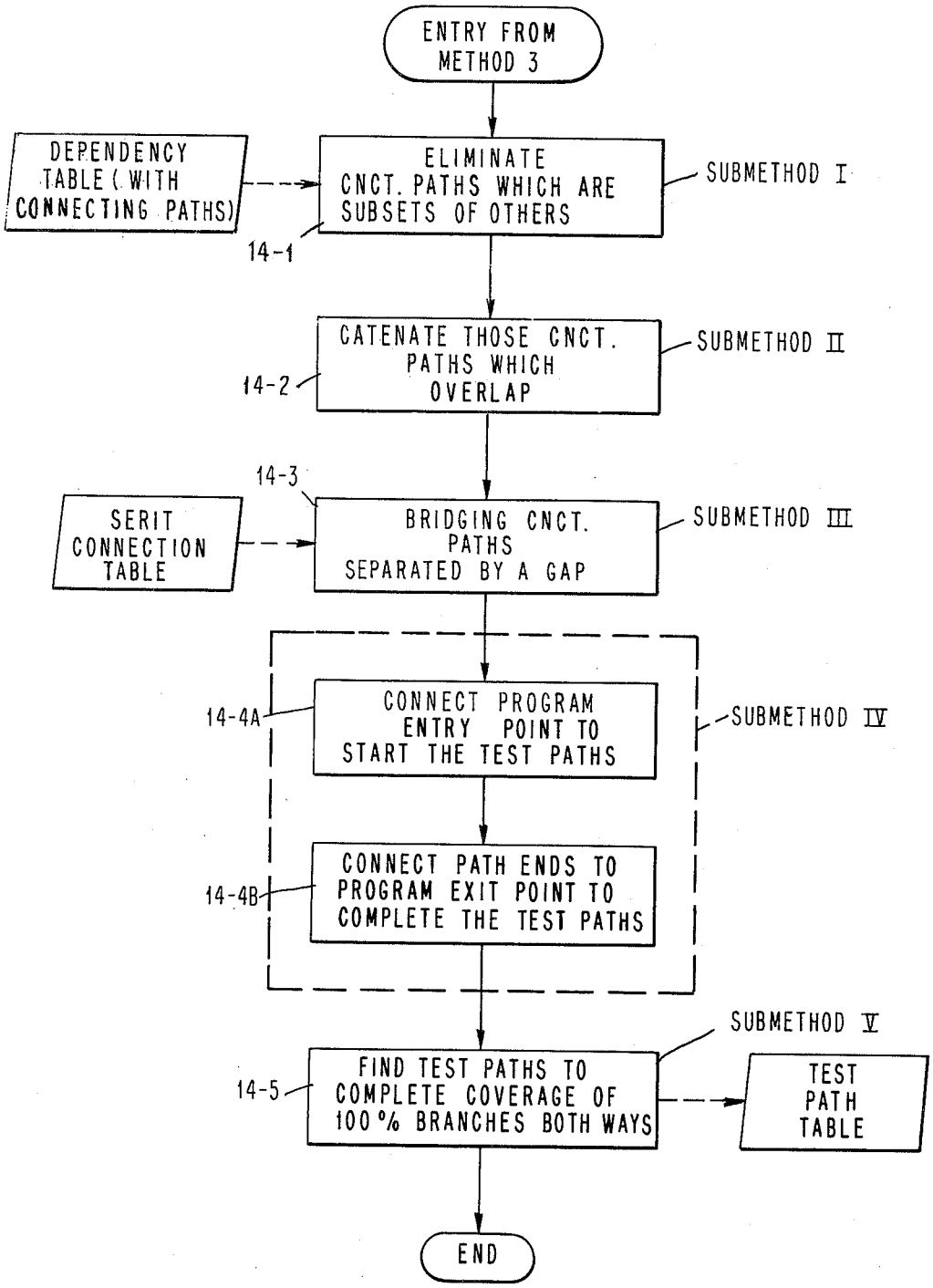

FIG. 14.1 (METHOD 4, SUBMETHOD I: ELIMINATING SUBSET CONNECTING PATHS)
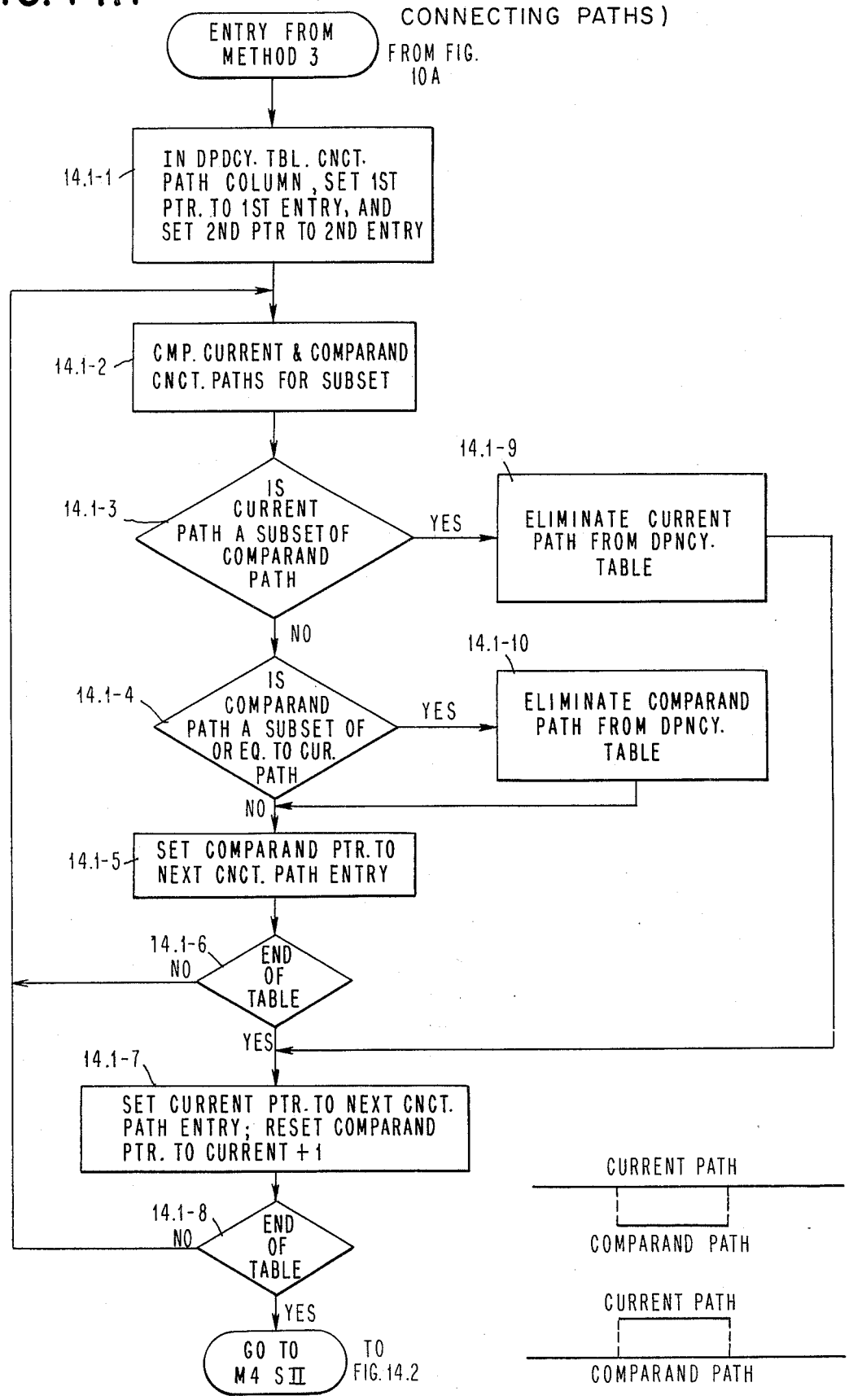

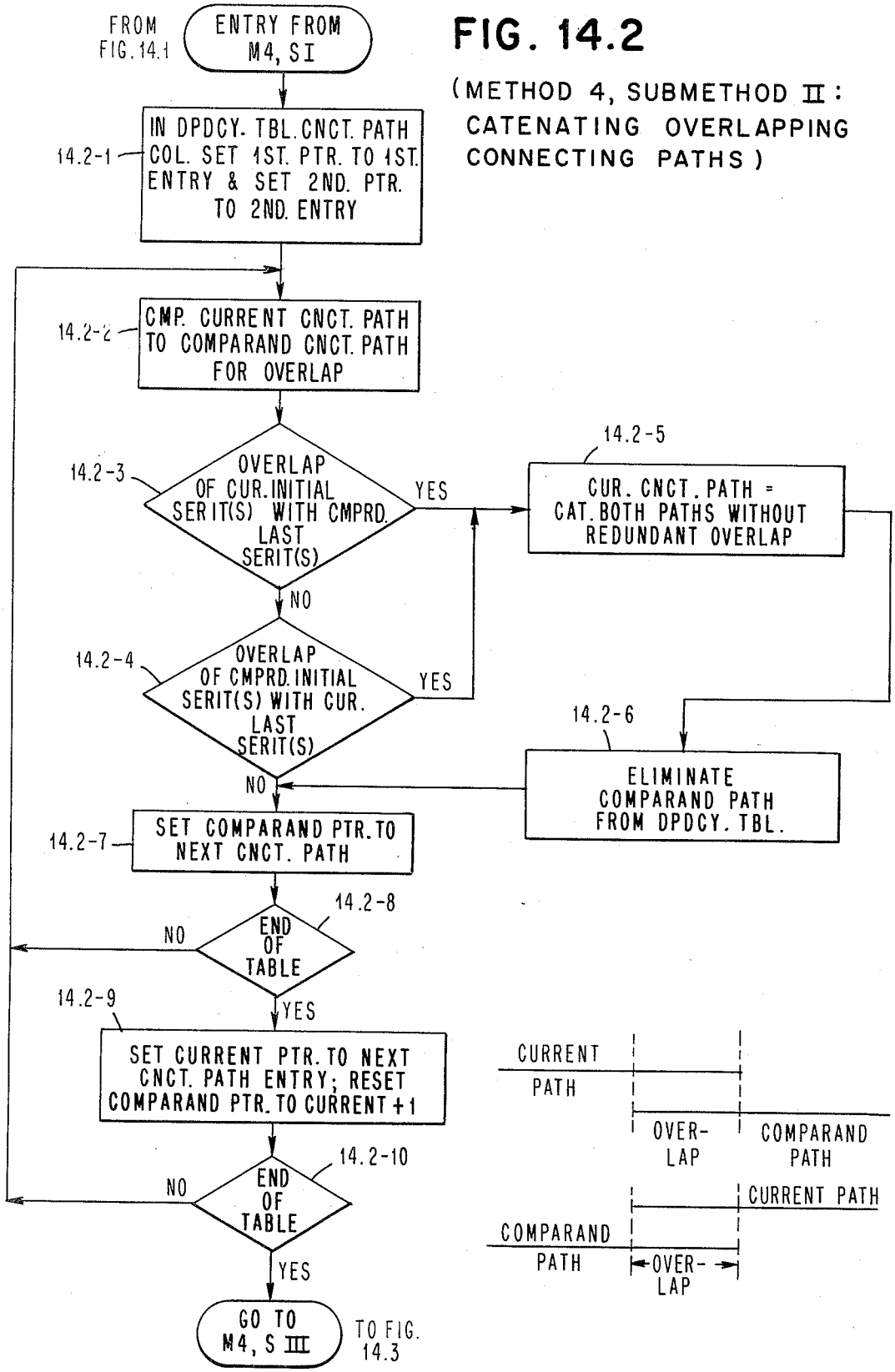
FIG. 14.2
(METHOD 4, SUBMETHOD II: CATENATING OVERLAPPING CONNECTING PATHS)
FROM FIG. 14.1
ENTRY FROM M4, SI
14.2-1
IN DPDCY. TBL. CNCT. PATH COL. SET 1ST. PTR. TO 1ST. ENTRY & SET 2ND. PTR. TO 2ND. ENTRY
14.2-2
CMP. CURRENT CNCT. PATH TO COMPARAND CNCT. PATH FOR OVERLAP
14.2-3
OVERLAP OF CUR. INITIAL SERIT(S) WITH CMPRD. LAST SERIT(S)
YES
NO
14.2-5
CUR. CNCT. PATH = CAT. BOTH PATHS WITHOUT REDUNDANT OVERLAP
14.2-4
OVERLAP OF CMPRD. INITIAL SERIT(S) WITH CUR. LAST SERIT(S)
YES
NO
14.2-6
ELIMINATE COMPARAND PATH FROM DPDCY. TBL.
14.2-7
SET COMPARAND PTR. TO NEXT CNCT. PATH
14.2-8
END OF TABLE
NO
YES
14.2-9
SET CURRENT PTR. TO NEXT CNCT. PATH ENTRY; RESET COMPARAND PTR. TO CURRENT + 1
14.2-10
END OF TABLE
NO
YES
GO TO M4, S III
TO FIG. 14.3
CURRENT PATH
OVER-LAP
COMPARAND PATH
CURRENT PATH
COMPARAND PATH
OVER-LAP FIG.14.3 (METHOD 4, SUBMETHOD III: BRIDGING THE CONNECTING PATHS SEPERATED BY A GAP)
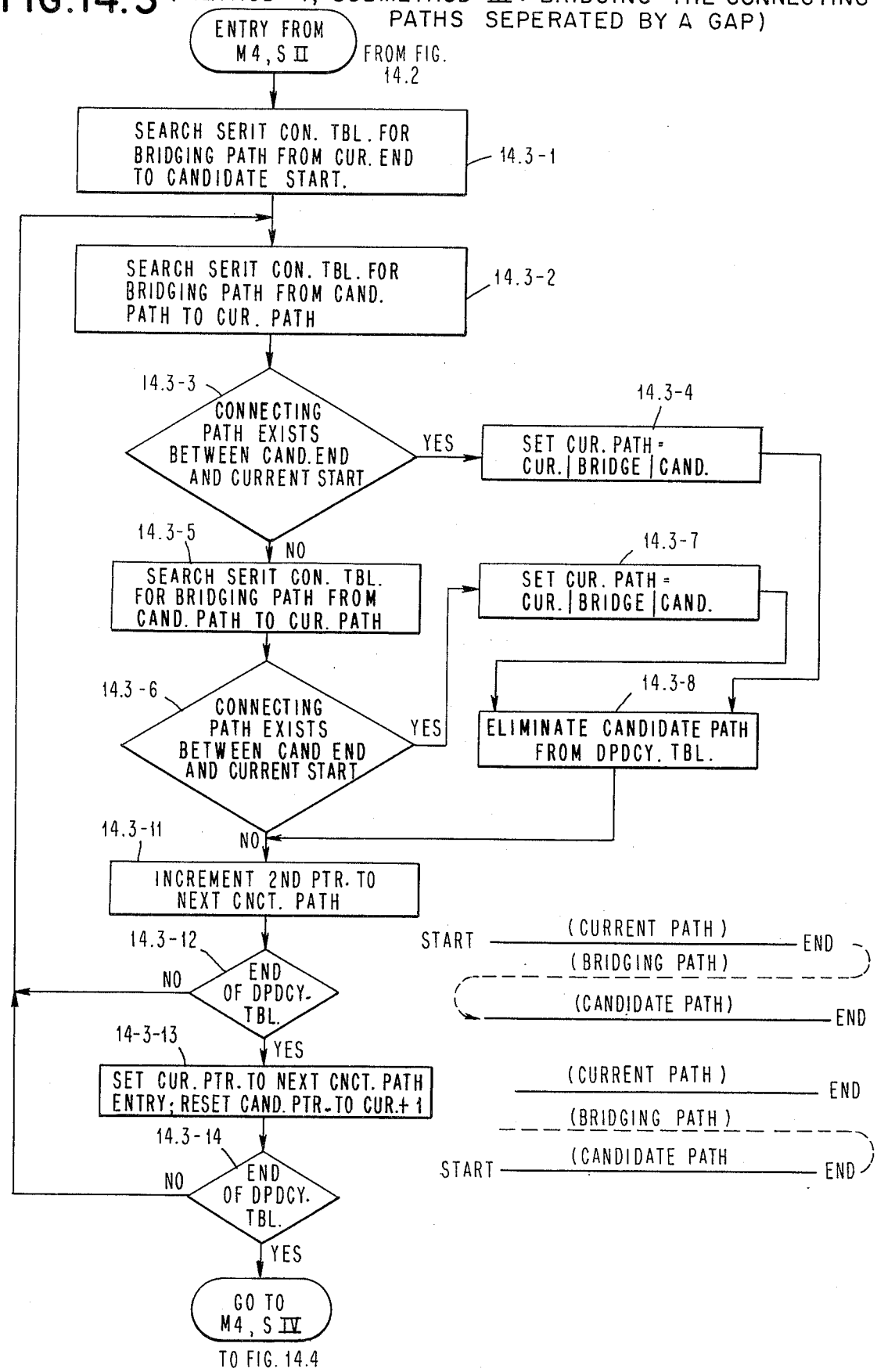

FIG. 14.5B
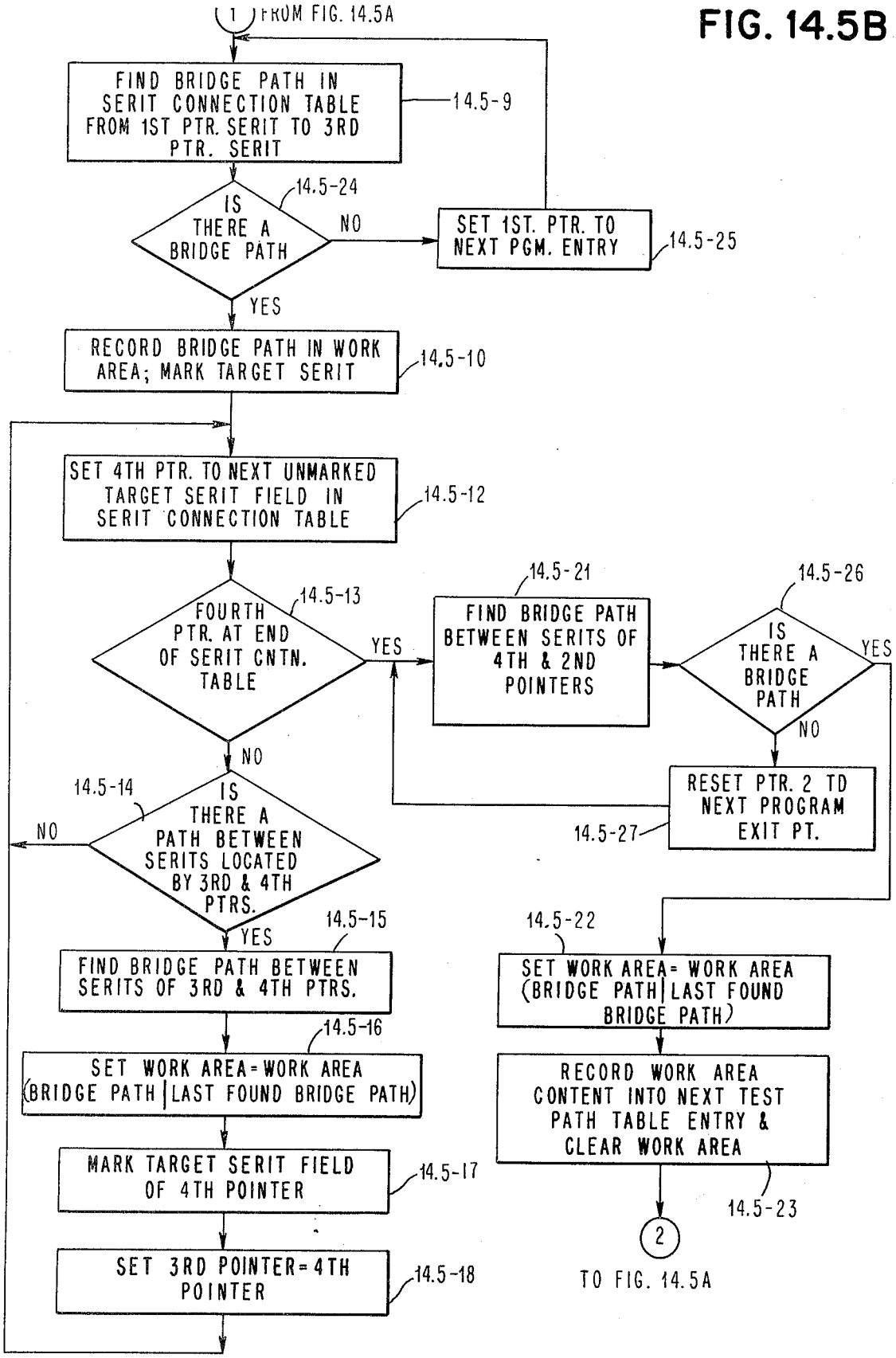

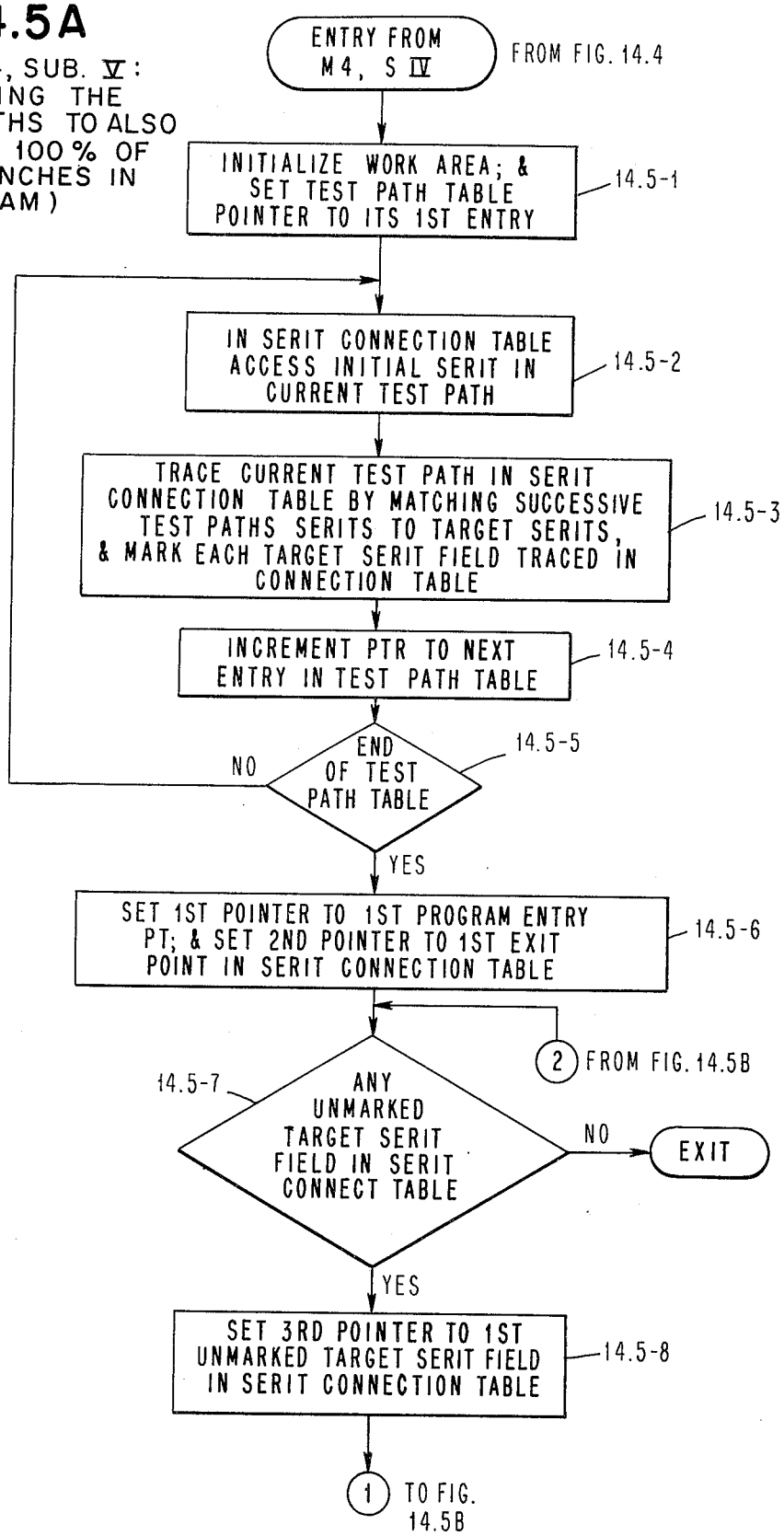

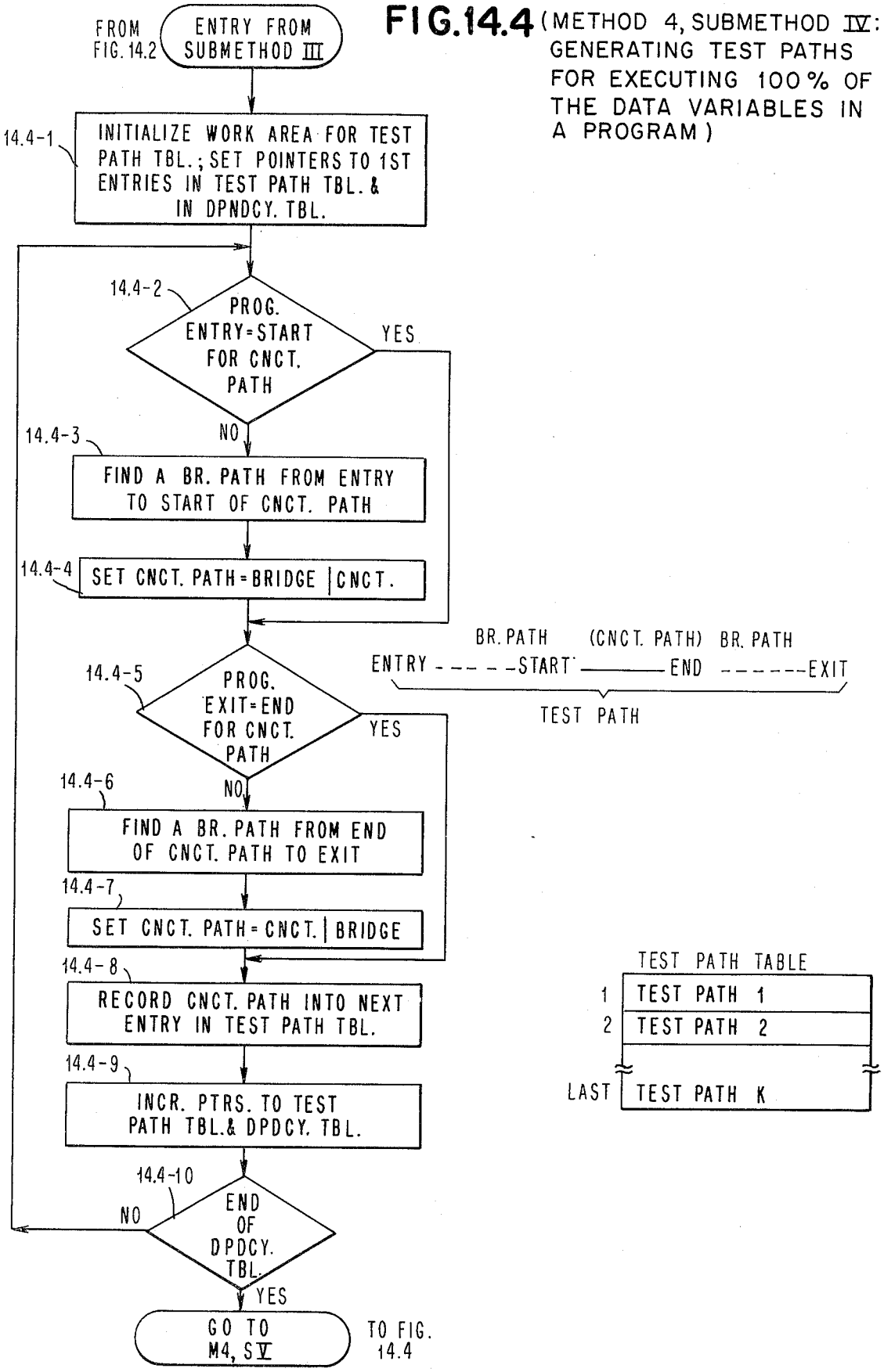
FIG.14.4 (METHOD 4, SUBMETHOD IV: GENERATING TEST PATHS FOR EXECUTING 100% OF THE DATA VARIABLES IN A PROGRAM)
FROM FIG. 14.2
ENTRY FROM SUBMETHOD III
14.4-1
INITIALIZE WORK AREA FOR TEST PATH TBL.; SET POINTERS TO 1ST ENTRIES IN TEST PATH TBL. & IN DPNDCY. TBL.
14.4-2
PROG. ENTRY=START FOR CNCT. PATH
YES
NO
14.4-3
FIND A BR. PATH FROM ENTRY TO START OF CNCT. PATH
14.4-4
SET CNCT. PATH=BRIDGE | CNCT.
BR. PATH
(CNCT. PATH)
BR. PATH
ENTRY
START
END
EXIT
TEST PATH
14.4-5
PROG. EXIT=END FOR CNCT. PATH
YES
NO
14.4-6
FIND A BR. PATH FROM END OF CNCT. PATH TO EXIT
14.4-7
SET CNCT. PATH=CNCT. | BRIDGE
14.4-8
RECORD CNCT. PATH INTO NEXT ENTRY IN TEST PATH TBL.
14.4-9
INCR. PTRS. TO TEST PATH TBL.& DPDCY. TBL.
14.4-10
END OF DPDCY. TBL.
NO
YES
GO TO M4, SV
TO FIG. 14.4
TEST PATH TABLE
1 TEST PATH 1
2 TEST PATH 2
LAST TEST PATH K FIG. 14.5A
METHOD 4, SUB. V: (COMPLETING THE TEST PATHS TO ALSO EXECUTE 100% OF THE BRANCHES IN A PROGRAM)